United States Patent
Auber et al.

(10) Patent No.: US 6,769,300 B1
(45) Date of Patent: Aug. 3, 2004

(54) FILL LEVEL MEASUREMENT DEVICE AND A METHOD FOR OPERATING SUCH A FILL LEVEL MEASUREMENT DEVICE

(75) Inventors: Herbert Auber, Schramberg (DE); Martin Mellert, Steinach (DE); Martin Mosmann, Wolfach (DE); Thomas Oehler, Gengenbach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 09/659,186

(22) Filed: Sep. 12, 2000

(30) Foreign Application Priority Data

Dec. 17, 1999 (DE) .......................................... 199 61 156

(51) Int. Cl.[7] .......................... G01F 23/00; G06F 19/00
(52) U.S. Cl. ......................... 73/290 R; 702/50; 702/55
(58) Field of Search .............................. 73/290 R, 291, 73/290 V, 313; 702/10, 50, 55, 45, 71, 72, 100, 104, 116, 189, 198

(56) References Cited

U.S. PATENT DOCUMENTS

| | | | |
|---|---|---|---|
| 5,207,251 A | * 5/1993 | Cooks | 41/83 |
| 5,377,128 A | 12/1994 | McBean | 364/571.04 |
| 5,464,038 A | * 11/1995 | Kruto | 137/486 |
| 5,579,775 A | * 12/1996 | Dempsey et al. | 128/670 |
| 5,675,092 A | 10/1997 | Denis | 73/861.78 |
| 5,751,611 A | 5/1998 | Jamieson | 364/573 |
| 5,770,153 A | * 6/1998 | Wagner | 422/79 |
| 5,912,814 A | * 6/1999 | Flood | 364/131 |
| 5,947,372 A | 9/1999 | Tiernan | 236/94 |

FOREIGN PATENT DOCUMENTS

| | | |
|---|---|---|
| DE | 3639 455 | 5/1988 |
| DE | 40 04 939 C2 | 8/1991 |
| EP | 0 501 900 | 9/1992 |
| FR | 2 640 747 | 6/1990 |
| FR | 2 739 929 | 4/1997 |

* cited by examiner

Primary Examiner—Hezron Williams
Assistant Examiner—Rodney Frank
(74) Attorney, Agent, or Firm—Gauthier & Connors LLP

(57) ABSTRACT

A fill level measurement device includes at least first and second removable and replaceable components that each include a non-volatile memory device. The device senses that the first removable and replaceable component has been inserted into the fill level measurement device, and provides a sensed signal indicative thereof. In response to the sensed signal, component customer parameter data is received at the first removable and replaceable component, and the received component customer parameter data is written into the non-volatile memory device of the first removable and replaceable component.

12 Claims, 1 Drawing Sheet

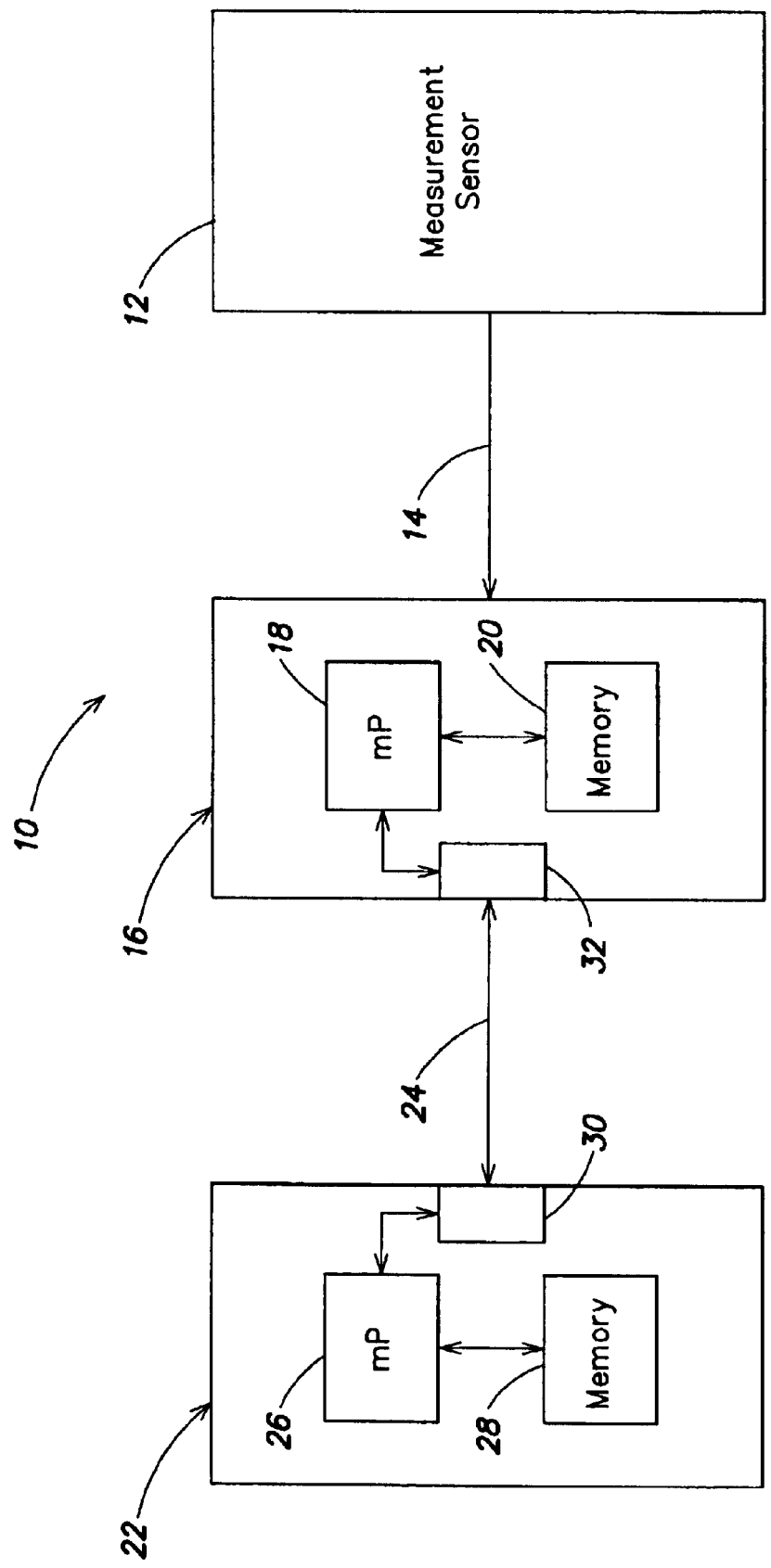

FILL LEVEL MEASUREMENT DEVICE AND A METHOD FOR OPERATING SUCH A FILL LEVEL MEASUREMENT DEVICE

BACKGROUND OF THE INVENTION

The present invention relates to the field of fill level sensors, and in particular to fill level sensors that include various removable and replaceable components that include memory containing fill level sensor data.

To measure the fill level of solid bulk goods or liquids in a container, several measurement techniques are known. For example, fill level measurements that employ radar, vibrating rods, pressure, and capacitance measurements are known.

These known sensing techniques often include a measurement sensor that is connected to a converter. This common connection on the converter and measurement sensor is often referred to as the process connection. The supply lines and the electric measurement lines of the measurement sensor are connected to those of the converter.

Voltage flashovers can occur at the measurement sensor, which destroy parts of the measurement sensor or the electronic analytical device. For applications in hazardous areas, precautions are prescribed, such as for example minimum distances between the electric lines, to assure reliable protection against explosions.

The data generated by the measurement sensor are conducted to a measurement data converter, which for example converts them into digital data, and transmits the digital data to an electronic analytical device. Before the fill level measurement device is started, customer-specific parameter data must be entered into the fill level measurement device. When the measurement data converter or the electronic analytical device are replaced, these customer-specific parameter data must be re-entered into the fill level measurement device, which results in undesirable complication.

Therefore, there is a need for a fill level measurement device that automatically updates customer specific parameter data when a component of the measurement device is replaced.

SUMMARY OF THE INVENTION

Briefly, according to an aspect of the invention, a fill level measurement device includes at least first and second removable and replaceable components that each include a non-volatile memory device. The device senses that the first removable and replaceable component has been inserted into the fill level measurement device, and provides a sensed signal indicative thereof. In response to the sensed signal, component customer parameter data is received at the first removable and replaceable component, and the received component customer parameter data is written into the non-volatile memory device of the first removable and replaceable component.

The measurement data converter includes a first non-volatile memory, and the electronic analytical device contains a second non-volatile memory, and that the same parameter data are redundantly stored in both memories.

The inventive fill level measuring device includes a measurement sensor, a measurement data converter, and an electronic analytical device. The measurement sensor is situated at the measurement point and measures the fill level, for example in a container or a tank. The measurement sensor is connected to the measurement data converter through a line. The measurement data converter generally is situated near the measurement sensor. The measurement data converter is connected to an electronic analytical device through another line. The measurement sensor transmits its measured data to the measurement data-converter, which converts them into digital data, and transmits them to the electronic analytical device.

The measurement data converter contains a first non-volatile memory and the electronic analytical device contains a second non-volatile memory. The same parameter data, which are absolutely necessary to operate the fill level measurement device, are redundantly stored in both of these memories.

If the measurement data converter is replaced because of a defect or for maintenance purposes, the parameter data, which are redundantly stored in the memory of the electronic analytical device, are automatically read into the memory of the new measurement data converter as soon as this has been installed. Similarly, when the electronic analytical device is replaced (e.g., because of a defect or for maintenance purposes), the parameter data redundantly stored in the memory of the measurement data converter are automatically read into the memory of the newly installed analytical device. Whether the measurement data converter or the electronic analytical device is replaced, the previously redundantly stored parameter data are again available in both memories as soon as the new device has been installed.

Because the parameter data that are necessary for starting and operating the inventive fill level measurement device are stored redundantly both in the measurement data converter and in the electronic analytical device, they no longer need to be entered anew when one of these two devices is replaced.

These and other objects, features and advantages of the present invention will become more apparent in light of the following detailed description of preferred embodiments thereof, as illustrated in the accompanying drawings.

BRIEF DESCRIPTION OF THE DRAWINGS

The FIGURE is a block diagram illustration of a fill level measurement device.

DETAILED DESCRIPTION OF THE INVENTION

The FIGURE is a block diagram illustration of a fill level measurement device 10. The device 10 includes a measurement sensor 12 that senses the fill level within a container or tank (not shown), and provides a measurement signal on a line 14 to a measurement data converter 16. The measurement data converter 16 includes a microprocessor 18 and a non-volatile memory 20. The measurement data converter 16 is connected to an electronic analytical device 22 via line 24. The electronic analytical device 22 includes a microprocessor 26 and a non-volatile memory 28. The microprocessor 18 is connected to the non-volatile memory 20, while the microprocessor 26 is connected to the non-volatile memory 28. The two microprocessors 18, 26 are connected to one another via the communication link on the line 24.

When fill level measurement device 10 is installed and first operated, the customer-specific parameter data are entered at least into one of the two non-volatile memories 20, 28. The customer-specific parameter data is then automatically read into the other non-volatile memory. However, they can also be read simultaneously into both non-volatile memories.

When the measurement data converter 16 is replaced, the data stored in the non-volatile memory 28 of the electronic analytical device are automatically read, via the line 24, into the nonvolatile memory 20 of the newly installed measurement data converter 16. Analogously, when the electronic analytical device 22 is replaced, the data stored in the non-volatile memory 20 of the measurement data converter 16 are automatically read, via the line 24, into the non-volatile memory 28 of the newly installed electronic analytical device 22.

Data transmission between the measurement data converter 16 and the electronic analytical device 22 can be for example asynchronous serial.

It is especially advantageous for the measurement data converter 16 and the electronic analytical device 22 to be electrically isolated. An especially suitable transmission medium between the measurement data converter 16 and the electronic analytical device 22 is for example an optical fiber or an electric conductor, with optocouplers 30, 32 at each end. Besides the data transmission, the transmission of the supply voltage is also electrically decoupled. The electrical isolation achieves a number of advantages.

For example, the supply lines are better protected against flashovers to ground, since no voltage flashover from the process connection to the measurement sensor can occur, because the electronics of the measurement sensor 12 are directly connected to ground.

Ceramic capacitive measurement sensors are used preferably for measuring the fill level, because they are distinguished by a number of advantages. However, ceramic capacitive measurement sensors have parasitic stray capacitances, between the housing and both the measurement capacitance and the reference capacitance. Due to! the unavoidable coupling of interference on the lines, especially in the low frequency range, this stray capacitance can cause a relative measurement error up to 50%. The electrical isolation advantageously eliminates this measurement error completely.

In hazardous areas, minimum distances are prescribed between the process connection and the supply lines, which carry supply currents between 4 and 20 mA. However, due to the electrical isolation, the measurement sensor 12 can very simply be built into a metallic process connection. A measurement sensor with a membrane electrode can be built in especially easily, because, due to the electrical decoupling, the membrane electrode can be electrically connected to the metallic process connection. No additional measures need to be taken any longer for protecting against explosion, such as for example safety distances between the process connection and the measurement data converter.

Finally, due to the electrical isolation, the measurement result is no longer garbled by the mutual coupling between the measurement data converter and the electronic analytical device. The electrical isolation thus substantially improves the signal-to-noise ratio.

As already mentioned, the electrical isolation can be realized by an optical fiber and two optocouplers 30, 32, or for example by a transformer.

A first essential advantage of the invention is that the measurement data converter 16 and the electronic analytical device 22 can be replaced while the system is running. A second essential advantage is that, after replacement of the part, no new adjustment is required, because the required data are stored redundantly and are automatically read into the empty memory of the newly installed part. The invention thus substantially reduces the expenditure of time and thus also the costs for maintenance and repair.

Although the present invention has been shown and described with respect to several preferred embodiments thereof, various changes, omissions and additions to the form and detail thereof, may be made therein, without departing from the spirit and scope of the invention.

What is claimed is:

1. A method of reconfiguring a fill level measurement device that includes at least first and second removable and replaceable components that each include a non-volatile memory device following the replacement of one of the first or second removable and replaceable components, wherein the fill level measurement device is configured and arranged to detect a material fill level within a container, said method comprising:

sensing that the first removable and replaceable component has been inserted into said fill level measurement device, and providing a sensed signal indicative thereof;

receiving component customer parameter data associated with the fill level measurement device at the first removable and replaceable component in response to said sensed signal; and writing said received component customer parameter data into the non-volatile memory device of the first removable and replaceable component.

2. The method of claim 1, wherein said step of receiving comprises receiving said component customer parameter data over an asynchronous serial data link.

3. The method of claim 1, wherein said step of receiving comprises receiving said component customer parameter data over a serial data link.

4. The method of claim 3, further comprising:

transmitting said component customer parameter data from the second removable and replaceable component over the serial data link to the first removable and replaceable component.

5. The method of claim 4, wherein said step of transmitting is performed in response in to receiving said sensed signal at the second removable and replaceable component.

6. The method of claim 5, further comprising computing and providing a fill level measurement signal using said component customer data.

7. A method of updating data in a first removable and replaceable electronic component of a fill level measurement device that also includes a second removable and replaceable electronic component, wherein the first and second removable and replaceable electronic components communicate via a communications link, said method comprising:

transmitting component customer parameter data associated with the fill level measurement device from the second removable and replaceable electronic component over the communications link;

receiving said component customer parameter data at the first removable and replaceable electronic component; and storing said received component customer parameter data into memory of the first removable and replaceable electronic component.

8. The method of claim 7, wherein prior to said step of transmitting, sensing that the first removable and replaceable electronic component has been inserted into the fill level measurement device, and providing a sensed signal indicative thereof to initiate said step of transmitting.

9. The method of claim 7, wherein said step of storing comprises writing said received component customer parameter data into non-volatile memory of the first removable and replaceable electronic component.

10. The method of claim 9, wherein said step of transmitting comprises transmitting said component customer parameter data comprises over a serial communications link.

11. A method of configuring a fill level measurement device that includes a first removable and replaceable component that includes a first non-volatile memory device, and a second removable and replaceable component that includes a second non-volatile memory device, following the replacement of one of the first or second removable and replaceable components, said method comprising:

sensing that said first removable and replaceable component has been inserted into said fill level measurement device, and providing a sensed signal indicative thereof;

in response to said sensed signal, transmitting component customer parameter data resident in the second non-volatile memory device from the second removable and replaceable component over a communication channel to the first removable and replaceable component;

receiving said component customer parameter data at the first removable and replaceable component in response to said sensed signal; and writing said received component customer parameter data into the first non-volatile memory device.

12. The method of claim 11, wherein said component customer data comprises data indicative of characteristics of the device in which the fill level measurement device is mounted.

* * * * *

UNITED STATES PATENT AND TRADEMARK OFFICE
CERTIFICATE OF CORRECTION

PATENT NO.    : 6,769,300 B1
DATED         : August 3, 2004
INVENTOR(S)   : Auber et al.

It is certified that error appears in the above-identified patent and that said Letters Patent is hereby corrected as shown below:

<u>Column 3,</u>
Line 33, after "Due to" delete "!".

Signed and Sealed this

Seventh Day of March, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,769,300 B1 | Page 1 of 1 |
| APPLICATION NO. | : 09/659186 | |
| DATED | : August 3, 2004 | |
| INVENTOR(S) | : Auber et al. | |

It is certified that error appears in the above-identified patent and that said Letters Patent is hereby corrected as shown below:

<u>Column 3</u> line 33, after "Due to" delete "!"

<u>Column 5</u>

In the claims, claim 10, line 5, after "data" delete "comprises"

Signed and Sealed this

Twenty-fifth Day of March, 2008

JON W. DUDAS
*Director of the United States Patent and Trademark Office*